Jan. 6, 1970   G. RAFFAELLI   3,487,869
NONSKID TIRE COVER WITHOUT LOCKING HOOKS
Filed March 16, 1967   2 Sheets-Sheet 1

INVENTOR
GIULIO RAFFAELLI

BY Kenyon & Kenyon
ATTORNEY

Jan. 6, 1970  G. RAFFAELLI  3,487,869
NONSKID TIRE COVER WITHOUT LOCKING HOOKS
Filed March 16, 1967  2 Sheets-Sheet 2

INVENTOR
GIULIO RAFFAELLI
BY
ATTORNEY

United States Patent Office 3,487,869
Patented Jan. 6, 1970

3,487,869
NONSKID TIRE COVER WITHOUT LOCKING HOOKS
Giulio Raffaelli, 12 Via del Duomo, Lucca, Italy
Filed Mar. 16, 1967, Ser. No. 623,726
Claims priority, application Italy, Mar. 26, 1966,
6,967/66; Jan. 16, 1967, 32,901/67
Int. Cl. B60c 27/10
U.S. Cl. 152—221    6 Claims

ABSTRACT OF THE DISCLOSURE

This invention relates to a nonskid tire cover, to be applied without hooks and comprised of two or more portions, joined to one another by cables whose length may be reduced in order to draw the ends of the portions together about a tire.

BACKGROUND OF THE INVENTION

My present invention relates to a cover to be applied on tires in order to prevent skidding on snow and ice, said cover being made of cloth ply, rubber, metal or other suitable material, with the eventual application of ice steel studs.

Such a cover is made of two or more portions, joined to one another by cables of suitable length, to be applied on tires by reducing length thereof, in addition to the employ of stretching devices, without requiring locking hooks in the inner side of the cover.

The devices hitherto available on the market for preventing tire skidding on snow or ice mainly are the following: the conventional nonskid chains, comprised of two side rings joined to one another by a plurality of metal or rubber link studs, which are applied by locking with hooks both the inner and outer rings, and putting the chains under tension by hand; special tire treads separated from the suitably shaped carcass, which may be applied by hoisting wheel from the ground and partially deflating tire; special winter tires having an engraved grip tread with nonskid function, which may be applied by hoisting car and replacing wheel; all these devices show the common drawback of a difficult application.

SUMMARY OF THE INVENTION

My present invention removes this drawback since the complete nonskid cover according to the invention has all prearranged linkages and no loose parts, so that there are no parts to be coupled, with particular advantage as far as the inner side of a wheel is concerned, and there is no need for hoisting car; this is obtained by connecting the inner ends of each portion of the cover by means of a cable which, running in suitable sheaths integral with the end of the adjacent portion, is stretched on the outer side of the tire by means of suitable stretching devices.

DESCRIPTION OF THE DRAWINGS

With reference now to the accompanying drawings, illustrating one of the possible embodiments of the cover according to my present invention, the invention itself will now be described by way of non-limiting example only.

DESCRIPTION OF THE PREFERRED EMBODIMENTS

Figure 1:
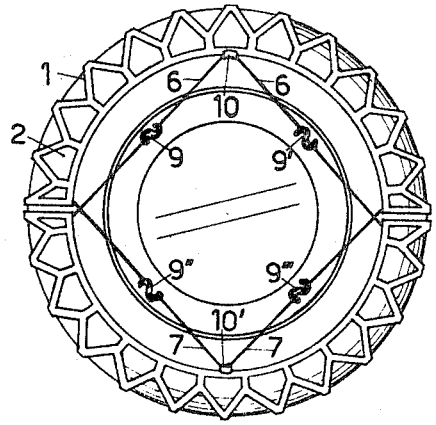
FIG. 1 is a front view of a two piece cover applied on a tire.

In the illustrated and disclosed embodiment of my present invention, cover 1 is comprised of two like portions 11 and 11', each portion consisting of a carcass 2 having a track 3 thereon made of metal, cloth ply, rubber or other suitable material; the inner ends of each portion are connected to one another by means of cables 6 and 7 made of metal, plastics or other suitable material and having a suitable length; cable 6 is fixed to portion 11, while cable 7 is fixed to portion 11'; each cable runs in a suitable sheath, provided at the end of the other portion and being made for example, of a flexible spiral steel wire.

Figure 2:
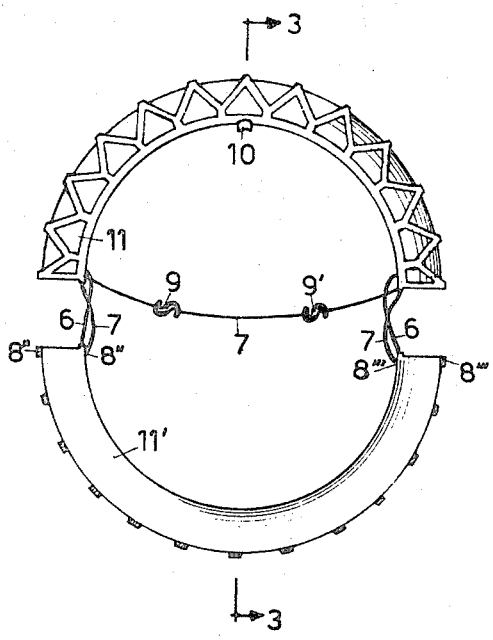
FIG. 2 is a front view of the cover with the two portions separated from one another, the lower portion being sectioned along line 2—2 of FIG. 3.
Figure 3:
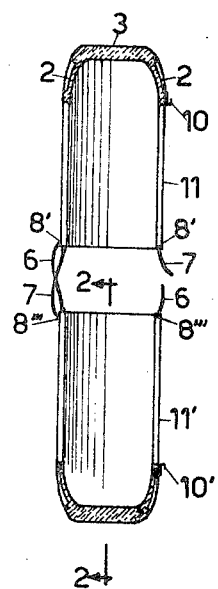
FIG. 3 is a longitudinal sectional view of the cover taken along line 3—3 of FIG. 2.

Referring now to FIG. 2 and FIG. 3, each end of the portion 11 is provided with a sheath 8 or 8' (not shown) while each end of the portion 11' is provided with a sheath 8" or 8'''. These sheaths are positioned inside the ends of each cover portion and form a sort of tunnel in which the cables 6, 7 can run. Each sheath or tunnel, which has a semicircular form like the section of the cover, has one opening in correspondence of the internal side of the cover, i.e. the side adjacent to the car, and the opposite opening in correspondence of the external side of the cover, i.e. the side easily accessible for the driver.

Cable 6 which has one end fixed to the internal side of the left end of cover portion 11, enters into the internal opening of the sheath 8" integral with the left end of the portion 11', passes through said sheath 8" coming out from the external opening of the same, enters into the external opening of the sheath 8''' integral with the right end of portion 11', passes through the sheath 8''' coming out from the internal opening of the same, and has finally its other end fixed to the internal side of the right end of portion 11.

Likewise cable 7 has one end fixed to the internal side on the left end of the cover portion 11', enters into the internal opening of the sheath 8 integral with the left end of portion 11, passes through the sheath 8 coming out from the external opening of the same, enters into the external opening of the sheath 8' integral to the right end of portion 11, passes through the sheath 8' coming out from the internal opening of the same and has finally its other end fixed to the internal side of the right end of the cover portion 11'.

The cables 6, 7 are both flexible and are made of metal, synthetic fibers or other suitable material. Nonelastic materials with high tensile strength are the most suitable to use for the cover according to the present invention.

Figure 4:
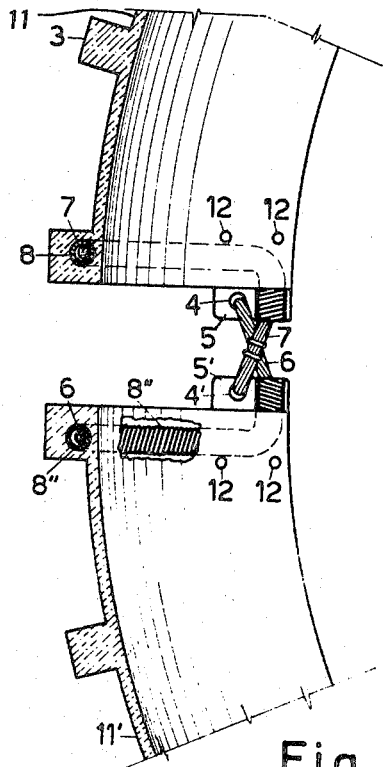
FIG. 4 is a sectional and partially fragmentary view which shows with more detail the adjacent ends of the two pieces of the cover at their internal side.

Referring now to FIG. 4, which shows with more detail a sectional view of the left ends of the cover portion 11 and 11', the cable 7 which is fixed to the cover portion 11' passes through the sheath 8 integral with the cover portion 11. Likewise, the cable 6 fixed to the cover portion 11 passes through the sheath 8" integral with the cover portion 11'. In the drawing, it is also shown that sheath 8", like the other similar sheaths 8, 8' and 8''', is preferably made of a flexible tubular spiral of steel wire.

In the illustrated embodiment, the end of cable 6 terminates to form a noose around the hole 4 of the plate 5 which is secured to the cover portion 11. Similarly, the end of cable 7 terminates to form a noose around the hole 4' in the plate 5' which is secured to the cover portion 11'. In this manner one end of cable 6 is fixed to the cover portion 11 and one end of cable 7 is fixed to the cover portion 11'. In the same way the opposite ends of cables 6, 7 are fixed to the opposite ends of portions 11 and 11' respectively.

The plates 5, 5' are secured to the portions 11, 11' respectively by any suitable means, for example by means of a plurality of rivets 12. In order to ensure an easy sliding of cables 6, 7, both the ends of the sheaths 8, 8' are preferably bent downwardly, while both the ends of the other sheaths 8", 8"' are bent upwardly (with reference to the drawings).

Figure 5:
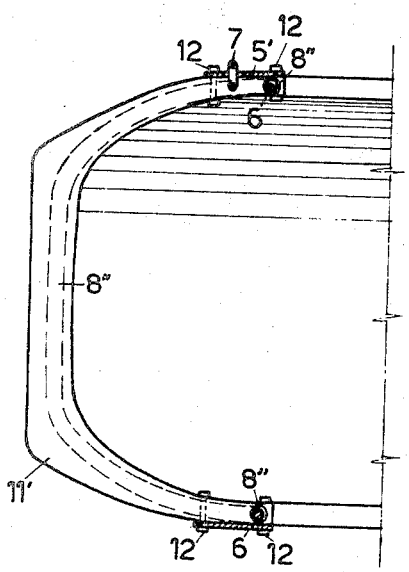
FIG. 5 is a fragmentary and partially sectional view of one end of one of the two pieces of the cover.

Referring now to FIG. 5, which shows a partially broken top view of the left end of the cover portion 11', the sheath 8" has ends which are bent upwardly to allow passage of the cable 6. The internal end of the sheath 8" is secured to the plate 5' which is fixed to the cover portion by means of rivets 12. To the plate 5, which is partially sectioned in the figure, is fixed the cable 7 terminating with a noose which is sectioned in the figure.

Figure 6:
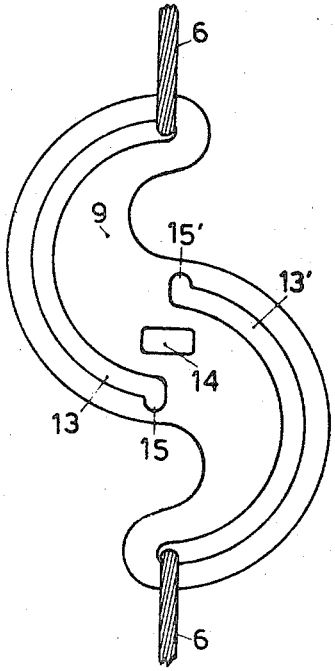
FIG. 6 is a side view of a S-shaped stretching device for locking the cover on the tire.

FIG. 6 illustrates a side view of a S-shaped device 9 for stretching the cables 6, 7 in order to lock the cover on the tire. The illustrated stretching device, which is the preferred one, is a known type of stretching device used in conventional tire chains. This known device 9 is a S-shaped metal plate which is provided with two semi-circular slits 13, 13' and a central hole 14. The hole 14 has a polygonal form, preferably a rectangular one, which is apted to receive a key of correspondent form. In the slits 13, 13' are slidably secured the ends of two different segments of the same cable (cable 6 in the figure). This can be obtained either by forming the cable ends like a noose, or providing the ends with a ring. When the length of the cable 6 joined to the stretching device 9 is to be reduced, it is sufficient to cause, by means of a key inserted in the hole 14, a rotational movement of 180° of the device 9. In this way the ends of both segments of cable 6 will slide along the slits 13, 13' and will rest respectively in the recesses 15, 15' near the central hole 14 locking the cover portion on the tire. Operating in the inverse way, the ends of the cable will be forced out the recesses 15, 15', caused to slide back along the slits 13, 13', and the cover portion is free to be pulled away from the tire. Each cable is preferably provided with a pair of stretching devices, as illustrated with 9, 9', 9" and 9"' in FIG. 1.

Figure 7:
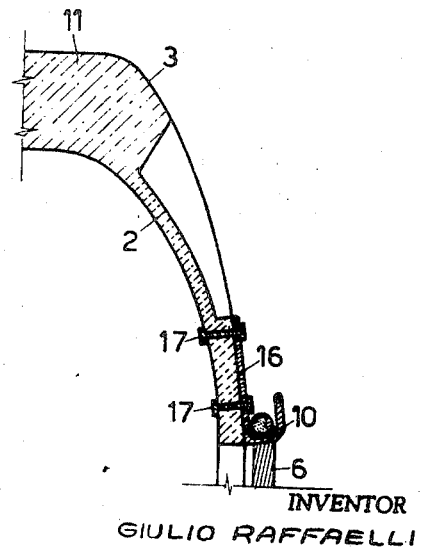
FIG. 7 is a sectional and fragmentary view which shows with more detail the upper right part of FIG. 3.

Referring now to FIG. 7, which shows a partially broken sectional view of the cover portion 11 in correspondence of the middle point between its ends, there is shown a fairlead 10 integral with the plate 16 which is fixed to the cover portion 11 by means of rivets 17. The fairlead 10 serves to receive in a sliding way the cable 6 when it is to be put under tension for locking the cover on the tire. A similar fairlead 10' is fixed in a diametrically opposed point to the cover portion 11'. Fairleads 10 and 10', besides helping in reducing the length of the cables, prevent them from striking against the wheel.

For applying the cover, one of the portions e.g. portion 11 is placed on the upper part of the tire; moving motor vehicle of a length which should be approximately equal to the half of the development of the tire circumference, said applied portion is brought under tire, so that the other portion of the cover according to my present invention may now be placed on the other half development of tire circumference, being now the upper part of the tire, by availing oneself of the possibility of spacing the portions of the cover from one another, said possibility being provided by the suitable length of the cables.

The length of the cables 6, 7 are then pulled causing them to slide in sheaths 8, 8', 8" and 8"' so as to draw the ends of the portions 11, 11' close to one another. The cables 6, 7 are finally positioned in the fairleads 10, 10' respectively. In order to lock the cover portions on the tire, the stretching devices 9, 9', 9", 9"' are caused to rotate for 180° by means of a suitable key as is known.

I claim:
1. A demountable nonskid tire cover comprising:
   a pair of cover portions;
   a plurality of sheaths, each sheath being integral with a respective end of each cover portion;
   first means on each cover portion intermediate said ends of each said cover portion;
   a pair of cables, each of said cables having the ends thereof secured to the ends of one respective cover portion, and each cable being slidably received in said sheaths of the other cover portion and being received in said first means of said one cover portion; and
   second means on each of said cables located between the respective ends of said cable and said first means for reducing the length of said cable to draw said cover portions together on a tire.

2. A demountable nonskid tire cover as set forth in claim 1 wherein said first means includes a fairlead on each of said cover portions.

3. A demountable nonskid tire cover as set forth in claim 1 wherein said second means includes a stretching device.

4. A demountable nonskid tire cover as set forth in claim 1 wherein each of said cover portions is made of rubber.

5. A demountable nonskid tire cover as set forth in claim 1 wherein each of said cover portions is made of metal.

6. A demountable nonskid tire cover as set forth in claim 1 wherein each cover portion is of semi-circular shape.

References Cited
UNITED STATES PATENTS

| | | | |
|---|---|---|---|
| 963,667 | 7/1910 | Vergote | 152—191 |
| 1,031,534 | 7/1912 | Day | 152—179 |
| 1,442,394 | 1/1923 | Geranio | 152—179 |
| 2,290,398 | 7/1942 | Wellington | 152—222 X |
| 2,540,230 | 2/1951 | Andrews | 152—222 X |
| 2,679,881 | 6/1954 | Gagne | 152—191 |
| 2,735,471 | 2/1956 | McLean | 152—187 |
| 3,027,926 | 4/1962 | Speer | 152—187 |
| 1,515,287 | 11/1924 | Szpak | 152—219 |
| 1,560,525 | 11/1925 | Barrell | 152—219 |
| 2,275,994 | 3/1942 | Ruhkala | 152—213 X |

ARTHUR L. LA POINT, Primary Examiner

U.S. Cl. X.R.

152—213